March 20, 1962 R. E. GRAHAM 3,026,375

TRANSMISSION OF QUANTIZED SIGNALS

Filed May 9, 1958 4 Sheets-Sheet 1

INVENTOR
R. E. GRAHAM

BY G. E. Hirsch Jr.
ATTORNEY

TRANSMISSION OF QUANTIZED SIGNALS

Filed May 9, 1958

INVENTOR
R. E. GRAHAM

BY A. E. Hirsch Jr.
ATTORNEY

March 20, 1962 R. E. GRAHAM 3,026,375

TRANSMISSION OF QUANTIZED SIGNALS

Filed May 9, 1958 4 Sheets-Sheet 3

INVENTOR
R. E. GRAHAM
BY A. E. Hirsch Jr.
ATTORNEY

March 20, 1962 R. E. GRAHAM 3,026,375

TRANSMISSION OF QUANTIZED SIGNALS

Filed May 9, 1958 4 Sheets-Sheet 4

INVENTOR
R. E. GRAHAM

BY A. E. Hirsch, Jr.
ATTORNEY

United States Patent Office 3,026,375

Patented Mar. 20, 1962

3,026,375

TRANSMISSION OF QUANTIZED SIGNALS

Robert E. Graham, Chatham, N.J., assignor to Bell Telephone Laboratories, Incorporated, New York, N.Y., a corporation of New York Filed May 9, 1958, Ser. No. 734,338

18 Claims. (Cl. 179—15)

This invention relates to the transmission of messages by pulse code techniques. Its principal object is to reduce the frequency bandwidth required for the transmission of digital representations of message wave samples without sacrifice of intelligibility or introduction of an objectionable amount of distortion into the reconstructed wave.

In the transmission of a message wave by pulse code techniques, the wave to be transmitted is sampled at successive instants, each sample, which may have any amplitude within a continuous range, is restricted to the nearest one of a preassigned number of discrete amplitude levels, i.e., quantized, the quantized samples are encoded, and the coded samples are transmitted to a receiver station where they are decoded and utilized to reconstruct the original wave. In the usual case the sampling operation is completely systematic and is carried out with perfect regularity at a fixed rate, known as the Nyquist rate, equal to twice the frequency of the highest frequency wave component which it is required to preserve. As is well known, systematic sampling at this rate does not entail any loss of information. Quantization, likewise, does not occasion any discernible loss of information or introduce objectionable granularity so long as a sufficiently large number of quantizing levels are employed. However, a large number of code pulses are required to encode a signal quantized to a large number of levels, and a correspondingly large channel capacity is required.

Consequently, various systems have been developed to reduce the amount of coded information required for the transmission of signals without a corresponding increase in signal degradation. One of the more promising of these involves use of so-called prediction-error coding. Such a system relies for its effectiveness on its ability to predict the value of successive samples solely from information contained in past values of the signal. By virtue of this ability, redundancy, which is found to exist in substantial quantities in most communication signals, is substantially reduced and encoding of the errors of prediction may be carried on in an efficient manner. In operation, such a system predicts the value of a succeeding sample of a signal, compares this predicted value with the actual value of the sample and then encodes for transmission only the difference between the two. The difference signal is often termed the prediction-error signal. At the receiver, the error signal and a predicted signal, equivalent to that predicted at the transmitter, are combined to yield a replica of the original signal.

The method of encoding takes into account the statistical structure of the prediction-error signal, allotting short coding patterns to small, frequently encountered error amplitudes, and progressively longer patterns to larger and less frequent errors. A buffer or coding reserve is required in the transmitter coding process, as well as in the receiver decoding process, in order to maintain a constant code pulse rate on the channel, notwithstanding the nonuniform code group lengths assigned to the uniformly spaced error pulses. If the prediction operation is highly successful, small errors and short code patterns will occur a large percentage of the time, and the average pulse rate required for transmission will be reduced.

Since the benefit from this type of predictive coding is dependent entirely upon the statistics of the prediction-error signal, highly accurate prediction is necessary to obtain a worthwhile reduction in the pulse rate. Prediction apparatus capable of doing a satisfactory job, particularly for signals which contain an appreciable amount of random noise, is complex both in concept and in design. Difficult instrumentation problems are encountered not only in the prediction process but also in the nonuniform coding operation. Moreover, a large number of quantizing levels are still required to convert the original continuous signal into a discrete one.

Of these problems, the one of successful prediction is probably the most serious. In the transmission of television signals, for example, prediction of succeeding samples is particularly difficult, especially in transient situations such as the occurrence of scene changes, motion, and sudden horizontal or vertical transitions. These transients represent in effect complete "surprises" and may cause unusually large errors in prediction. Extended runs of large prediction errors may exhaust the coding reserve of such a system and cause system failure thereby introducing a high degree of degradation into the transmitted signal.

In systems of a related class, the sampling operation is unsystematic and carried out erratically so that samples occur in an irregular fashion in dependence on the complexity of the message signal. This class also includes variable speed scanning systems, variable density sampling systems and the like. More generally, the systems of this class which have been proposed for more efficient encoding include those in which: the samples are regularly spaced in time with respect to the scanning path, i.e., with respect to the time scale of the original picture material, but are irregular with respect to channel time; the samples are irregular with respect to the scanning path and regular with respect to channel time; or the samples are irregular with respect to both. That is to say, an elastic relationship may exist either between the time scale of the message signal and that of the corresponding event in the encoded signal, or between time and distance along a scanning path. The improvement in transmission efficiency offered by these erratic systems lies in the accuracy with which the samples specify the signal in difficult regions, and also in the fashion in which the samples may be coded for transmission. However, elastic coding in any of these forms requires difficult instrumentation. Consequently, systematic sampling and coding systems which require a simple and uniform code alphabet offer substantial advantages.

In accordance with the present invention, the seeming incompatibilities of these divergent classes are resolved and an economical compromise is effected between them. Accordingly, the accuracy with which a signal sample is predicted is effectively increased first by guaranteeing sufficient time to predict repeatedly "difficult" samples occurring in regions of greatest signal change until a sufficiently close approximation to the actual value of the signal is found, and second, by restricting noticeable errors of prediction to perceptibly permissible regions of the signal.

In effect, extra describing samples are provided at the normal sampling rate, but only as required to ensure accurate portrayal of the original signal. Introduction of the "extra" samples, effected by the repeated prediction of different samples, is accomplished automatically upon the occurrence of a sufficiently large prediction error. Conveniently, a "cueing" control signal is generated upon such an occurrence to initiate the reprediction of the sample in question. Sufficient time for the introduction of these samples is obtained, without altering the primary sampling rate or increasing the required signal bandwidth, by selectively compressing those intervals in the signal which are idle, or which are reserved for other low priority signals, to provide a "reservoir" of extra samples. In television, the time required for the rservoir of samples is conveniently found in blanking or synchronizing intervals. In speech applications, the reservoir of extra samples is drawn from silent periods occurring between words, phrases, and sentences. Any convenient form of elastic coding may be employed, in accordance with the invention, to compress the time scale of any signal which normally occupies the reservoir intervals.

Because of the operation of the system as described in the foregoing paragraph, the system may be termed a "reservoir" sampling system.

All of the operations carried on at the transmitter can be duplicated at the receiver without any additional information beyond that contained in the transmitted signal itself. Accordingly, when one or more extra samples are transmitted to supplement a "normal" sample, the receiver utilizes only the best of the successively improved prediction values available, the alternative error samples are discarded, and the over-all signal is restored to its normal dimension in time.

In accordance with a further feature of the invention, noticeable errors of prediction are relegated to perceptibly permissible signal regions. There is evidence from psychovisual observations that in those situations in which a predictor makes sizable errors, because it is surprised, the perceptual discrimination of the human observer is particularly low so that large quantizing distortions in encoding these large prediction errors will not be noticeable. The kind of signal behavior, implied by low-predictability, low-discernibility situations depends to a considerable extent upon the sophistication of the prediction process. In dealing with television signals for example very simple prediction such as that obtained by estimating each oncoming sample to be the same as its immediate predecessor or the so-called previous-value prediction will yield large transient errors at vertical lines or edges in the picture. Correspondingly observer discernment is fairly low in such regions. More effective prediction achieved by detailed use of the signal past and possibly including information from previous frames may result in sizable errors only in highly chaotic regions of the picture or perhaps in regions where there is rapid motion in the original scene. Since it is in precisely such situations that viewer discrimination is very poor it may be seen that the link between prediction difficulty and large tolerance in reproduction is a strong one.

Thus it is in accordance with the invention to employ a process of predictive quantizing wherein the difference between successive samples of a continuous wave and a predicted version of the wave are quantized for transmission as opposed to the usual quantization of the original wave itself. Predictive quantizing is a truly perceptual coding technique in which the primary objective is not necessarily accurate prediction all or almost all of the time which frequently is impossible but only accurate prediction in those signal regions where observer perception is high. This appears to be a more durable concept than that involved in statistical coding systems which tend to produce serious degradations whenever the running statistics of the signal depart appreciably from those postulated in the system design.

The quantizing operation in accordance with the present invention is tailored to the observer's perception by employing fine quantum steps for small prediction errors and coarse quantum steps for the larger errors which may occasionally result. With this tapering of the steps in the quantizer staircase, the total number of levels needed in quantizing the error signal for satisfactory reproduction is small enough that simple nonstatistical coding yields a substantially lower bit rate than does conventional quantizing. The use of a tapered staircase in quantizing prediction errors is an important step in implementing the foregoing concept of perceptual coding, the primary intention of the modified quantization process being to reduce the size of the coding alphabet and not merely to affect the statistical properties of the transmitted signal.

The invention will be fully apprehended from the following detailed description of a preferred illustrative embodiment thereof taken in connection with the appended drawings in which.

In the interests of simplicity, the circuit diagrams to be discussed are presented, for the most part, in block-schematic form; with single-line paths which direct the flow of energy and apparatus components which process it. It is to be understood that, in practice, each single-line energy path will normally be actualized with two electric conductors, one of which may, in many cases, be connected to ground.

Figure 1:
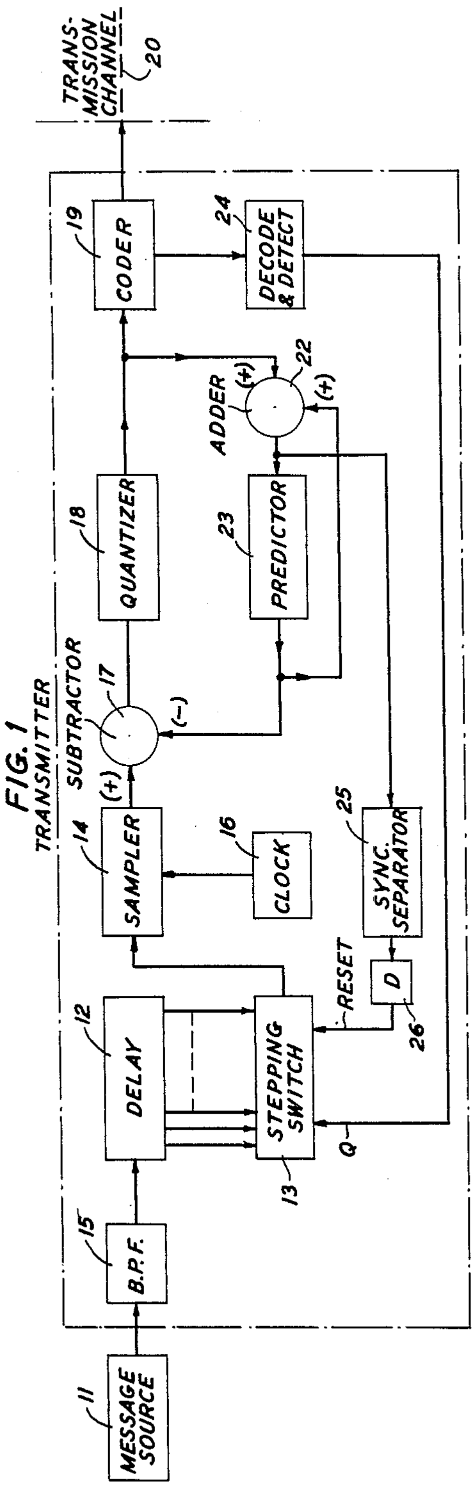
FIG. 1 is a block schematic diagram showing transmitter station apparatus embodying the invention.

Referring now to the drawings, there is shown in FIG. 1 a signal transmitting station employing the principles of the invention. A message to be transmitted, which may be, for example, a standard television wave including blanking and synchronizing information and originating in any conventional source of waves 11, is applied to the input terminal of a tapped delay line circuit 12. If desired, the composite signal from source 11 may be band limited in filter 15 before it is applied to delay circuit 12 to avoid undesirable beats and local interference. The circuit 12 delivers a delayed version of the applied signal successively on each of its several output terminals, the time of occurrence of the signal on each of the terminals being dependent upon the delay period of the circuit and the separation between terminals. According to the invention, the several output terminals of the delay line circuit are separated by intervals corresponding to the periods between successive picture elements derived in systematic scanning of a picture. In the normal television case, this is equal to a Nyquist interval or approximately one-eighth of a microsecond. In well-known fashion, the delay circuit delivers each signal applied to its input terminal, delayed in time, on each of its output terminals in sequence.

Figure 3:
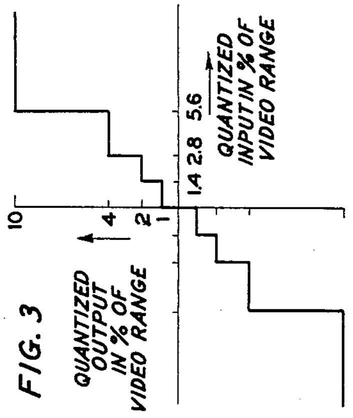
FIG. 3 is a graphic representation of the transfer characteristic of a quantizer suitable for use in the practice of the invention.

A stepping switch 13, which may be of any known form, and include, for example, a plurality of diode gating circuits, is provided to supply the signals appearing on a selected one of the delay circuit output terminals to sampler 14. As the stepping switch is energized by stepping or "cueing" (Q) pulses, the signals from the delay circuit terminal nearest the input end and then from the remaining terminals to the left are selected in turn for application to sampler 14. The exact mode of stepping will be explained more fully hereinafter. The sampler delivers to its output terminal a brief sample of the amplitude of the applied wave each time its control terminal is energized. Energizing pulses for the sampler 14 at the Nyquist rate, may be produced in any well known fashion, for example, by clock 16. The delayed and sampled signals are applied to subtractor 17 which combines them with predicted versions of the samples and passes the difference signals to quantizer 18. Although the quantizer may take any form well known in the art, it preferably has a tapered staircase transfer characteristic, a suitable form of which is shown in FIG. 3. Quantizers suitable for this application are well known in the art. The output of the quantizer 18 is a multilevel quantized "error" signal which is encoded in binary coder 19 for transmission over a channel 20 to a receiver station. Transmission may be carried out by wire or radio or by any desired means; such apparatus not being a part of the present invention.

At the same time, at the transmitter station, each quantized error signal is fed back through an accumulator network which may comprise, for example, an adder 22 and a predictor 23, to the subtractor 17. Signals derived from the predictor 23, in addition to being applied to subtractor 17, are returned to the adder 22 and additively combined with the signals applied to the input of the adder. Consequently, each input to the quantizer 18 is a signal equal to the error between the value of the sample applied to the adder 22 and the predicted value of the sample, where the prediction is based not on the past of the original signal but on the past of an approximate signal. The approximate signal corresponds to one that may easily be developed at the receiver station. It is essential that the transmitter prediction be done in this fashion in order that the receiver may duplicate its action precisely since the approximate or quantized signal is the only one that is available at the receiver.

In its simplest form, the predictor 23 may consist of a delay line circuit having a delay time equal to the spacing between samples, i.e., a Nyquist interval. Alternatively, any one of the so-called "linear" predictors such as "previous value," "slope," "planar" and the like, described by C. W. Harrison in "Experiments with Linear Predictors in Television" in the Bell System Technical Journal for July 1952 may be used, or one of the so-called "nonlinear" variable mode predictors shown in my copending application, Serial No. 625,476, filed November 30, 1956, now Patent 2,905,756, granted September 22, 1959, may be employed.

Since an observer is very sensitive to discontinuities in brightness occurring within a picture but is relatively insensitive to amplitude errors in reproducing such discontinuities, providing the errors are highly localized, the transfer characteristic of quantizer 18 is tapered to restrict large errors to the coarse portion of the quantizer staircase. As shown in FIG. 3, the staircase characteristic of the quantizer 18 is symmetrical about zero and has a vertical step at the origin. Accordingly, the quantizer is forced to hunt whenever the input signal is quiescent. However, the closely spaced levels ±1 do not permit the oscillations to be noticeable in the reconstructed picture particularly since the oscillation frequency tends to be toward the top of the band. While there are a great number of ways in which the step size can be increased as a function of the input amplitude, and in which the output representative levels can be distributed between the input decision levels, a preferred spacing is shown in the figure which affords eight levels in the output signal and thus may be coded into three bits per sample.

By virtue of the tapered staircase characteristic, fine detail material, void of large amplitude changes, is accurately quantized. In the event, however, that extremely large errors are produced in predicting the value of a sample, it is in accordance with the present invention to utilize, in effect, an extra prediction sample drawn from a reservoir of surplus sample times available in the signal. Assuming that the staircase of quantizer 18 includes eight levels, the coder 19 translates each sample into a constant length code having three binary digits per sample. As long as only the interior levels of the staircase ±1, ±2, ±4 are occupied, encoding continues in normal sequential fashion. Whenever the predictor makes a large error, however, such that level ±10 is occupied, the corresponding sample is encoded for transmission as usual and, in addition, the code group representing this sample is locally detected in a binary code detector 24 to provide a pulse (Q) which may be utilized to activate stepping switch 13, thereby to shift the direct connection between the delay line 12 and sampler 14 to the right by one sample interval, i.e., the stepping switch "steps" one terminal to the right. As a result, the next sample of the input signal taken from the delay line circuit is precisely the same as the preceding one and sampling of a new portion of the input signal is momentarily delayed. However, predictor operation continues in the normal fashion and produces a prediction value of the repeated sample based on its past history which includes the previous prediction value of the same sample. The prediction operation on the second trial will tend to be more successful than it was on the first and the sample following quantization will be likely to occupy one of the interior quantizer levels. If so, system operation continues once again in the normal fashion. However, if the quantized output once again lies in the ±10 level, the delay circuit connection is shifted again and a new prediction value is produced. Shifting of the connection of the delay circuit terminals and reprediction of the sample continues until the error is restricted to one of the acceptable interior levels of quantization. The shifting operation occurs in response to the detection in code detector 24 of a code pulse group indicative of a pulse lying in the ±10 level of quantization. Pulse groups indicative of signals lying within the acceptable levels are ignored. The code detector 24, which may be conventional in all respects, generates cueing pulses suitable for causing stepping switch 13 to shift one position to the right for each pulse.

At the end of a predetermined time, established in television, for example, by the number of samples normally included in the active picture time of a full horizontal line plus a major portion of the horizontal blanking interval between lines, or the vertical blanking interval between frames, the stepping switch 13 is reset so that the first signal element in the next line of picture information appearing at the first terminal (left extreme) of the delay circuit will be applied to the sampler 14. The 10 microsecond horizontal blanking intervals of standard television signals afford a reservoir of approximately 80 Nyquist intervals per scanning line which may be used to insert extra samples for difficult prediction regions of the input signal. The vertical blanking period constitutes a reserve of about 8000 Nyquist intervals; however, for simplicity of exposition, use of only the horizontal blanking intervals will be described.

Since the synchronizing pulse is a precisely defined pulse in television transmission, included periodically in the signal solely to provide sufficient information for the receiver to enable it to operate in synchronism with the transmitter, it is obvious that any form of signal may be used for this purpose. Hence, the standard blacker-than-black pulse normally associated with a television signal may be suitably altered in form for transmission. In accordance with the present invention, it is altered primarily by compressing it on the time scale to occupy a much shorter than normal time period. Any form of time scale buffering may be employed for this purpose. The synchronizing pulse and any other information positioned in the nonactive portion of a line scan may, therefore, be transmitted as a mere vestigial pulse indicative, for example, of the leading edge of the normal synchronizing pulse. In the event of complete deletion of the blanking and synchronizing wave forms, receiver synchronization may be effected by a counting operation based on the clock frequency of the digital channel. For purposes of illustration, however, a system will be described in which a fraction of the intervals in the horizontal blanking period are retained so that a vestigial synchronizing signal may be transmitted to the receiver station. The resetting operation thus is conveniently initiated by a pulse coinciding with the leading edge of the horizontal synchronizing pulse. This pulse appears at the input to predictor 23 and may be separated for use in conventional fashion in separator 25 and applied to the reset input terminal of stepping switch 13. A small delay is preferably inserted in the reset output from synchronizing separator 25 in order to insure that the sample value corresponding to the leading edge of the synchronizing pulse is delivered to the subtractor 17 prior to the resetting operation.

Thus, it is in accordance with the invention to selectively expand the time scale of the video signal normally transmitted within a predetermined portion of each scanning line and to compress the time scale of the synchronizing signal information normally inserted within the remaining portion of the line scanning period.

At the receiver station, the code pulse groups, after demodulation, regeneration, and amplification as required, are applied to decoder 30. Its output, in the form of quantized pulses, is applied to a predictive accumulator similar to the one employed at the transmitter. The accumulator includes adder 31 and predictor 32. The output of the accumulator is applied by way of inhibit gate 33 to a stepping switch 34 which may be in all respects similar to the stepping switch 13 of the transmitter. The multiple output terminals of stepping switch 34 are connected respectively to the plurality of terminals of delay circuit 35 and the output of the delay circuit is applied to one of the input terminals of OR gate 36. The delay line circuit 35, similar to circuit 12 of the transmitter, has a number of terminals corresponding to the terminals of delay circuit 12 but is, however, connected so that the samples from the accumulator are applied to the taps and stepped by means of switch 34 to the right in response to cueing signals. As in the case of the delay circuit 12 at the transmitter, signals are applied to one of the delay circuit terminals, the left one, continuously so long as the sample values of the received signal are restricted to the interior quantization levels. In the event that a pulse code group is received indicative of a sample lying in the outermost quantizer levels, i.e., $\pm 10$, this event is detected by auxiliary code detector 39, which bridges the output of decoder 30, and steps the switch 34 one step to the right. At the same time this pulse is applied to the inhibit gate 33 and prevents the corresponding signal from adder 31 from reaching the delay line. Consequently, when such a sample value occurs, the receiver system omits the corresponding sample from its delivered output signal, since the succeeding sample will itself be the cumulative result of the two samples allotted to a single ordinate value of the original input signal. When two steps occur in immediate succession, two samples are discarded and so on. It is to be particularly noted that in the case of receiver delay circuit 35, as distinguished from transmitter delay circuit 12, the insertion delay is reduced as stepping takes place to the right. The opposite is true at the transmitter.

In the event that the stepping action causes the right hand terminal of the delay circuits 12 and 35 to be reached prior to the occurrence of the reset pulse, it is necessary that the receiver ignore all further cueing instructions prior to the arrival of the reset pulse. In particular, the inhibit gate 33, in this situation, must no longer prevent samples corresponding to the $\pm 10$ quantizing levels from reaching delay circuit 35, since there can be no following extra sample to constitute the required output signal. The desired receiver operation may be achieved by employing a counter 43 and an inhibit gate 44. Counter 43 counts the cueing signals generated by $\pm 10$ quantized samples and, when a count is reached corresponding to the number of terminals on the delay circuits 12 and 35, causes inhibit gate 44 to block all further cueing signals from reaching inhibit gate 33 or stepping switch 34. The counter is reset by the leading edge of the synchronizing pulses.

Resetting of the stepping switch at the receiver occurs in synchronism with the corresponding operation at the transmitter. The leading edge of the vestigial synchronizing pulse is a convenient pulse to accomplish this action although it is to be understood that any predetermined identifying symbol may be employed for this purpose. Alternatively, a simple counter at both the transmitter and receiver may be employed to perform the resetting operation following a predetermined number of timing intervals. In the embodiment shown by way of illustration, synchronizing pulses are derived from the input to predictor 32 by synchronizing separator 40 and applied directly to the reset terminal of stepping switch 34. As mentioned above the signals appearing at the input to predictor 32 are identical to those applied to predictor 23 at the transmitter. Accordingly, each received synchronizing pulse resets the switch 34 to the left in a fashion such that the samples subsequent to the leading edge of the synchronizing pulse are applied to the extreme left hand terminal of delay circuit 35. Consequently, the samples currently in the delay line circuit to the right of the last terminal of application continue to propagate down the line but are followed by an interval void of samples. The length of this blank interval is dependent upon the number of steps through which stepping occurred in the previous line of information. By conventional adjustment of the system parameters, the timing intervals for which no samples pass through the terminal end of the line may produce output signals at any pre-established amplitude level. For television transmission, it is preferred that the video black level be selected. Hence, the idle sample periods derived from the delay line circuit following each resetting of the line may constitute a period of apparent black value.

Since it is desirable for the synchronizing pulse to initiate the resetting action in a fashion such that the sample value for the leading edge of each synchronizing pulse, passed by inhibit gate 33 as a part of the composite signal, is transmitted to the connected terminal of the delay line prior to reset, the reset input to stepping switch 34 may be provided with a time delay equal to a fraction of a Nyquist interval. Accordingly, the vestige of the synchronizing pulse passed by inhibit gate 33 will appear at the output of the delay circuit at its normal position and time within the composite signal. In many applications a vestige of the signal is sufficient for synchronizing a utilization device since it normally has provision for stripping all synchronizing information from the composite signal and generating a new pulse for reinsertion in the signal. Further provision is made, however, in the illustrative receiver shown in FIG.

2 to reconstitute the synchronizing pulse so that the output signal from the receiver is a replica of the message signal applied to the transmitter.

Any conventional form of synchronizing signal reconstituting means may be employed in the practice of the invention. A simple one comprises synchronizing separator 41 connected to the output of delay circuit 35, and a pulser 42. The pulser responds to each applied vestigial synchronizing signal and generates therefrom a pulse whose amplitude and width may be adjusted to correspond to any desired pulse shape, and whose leading edge is substantially coincident in time with the leading edge of the vestigial synchronizing pulse reaching OR gate 36 from delay circuit 35. It may include the necessary clippers and amplifiers. The new pulse is then applied to the second input terminal of OR gate 36 and is added to the signal applied to the first terminal of the gate, i.e., the signal derived from delay line circuit 35, to form a composite signal. A clipper may be used, if desired, to remove the residue of the vestigial synchronizing signal passed by the delay circuit 35.

If a continuous message wave is the desired output, the composite train of restored samples may be passed through low pass filter 37 which operates in accordance with established electronic techniques to yield a continuous wave. This wave, which is equivalent to the original wave supplied by source 11, may be applied to utilization device 38.

Figure 4:
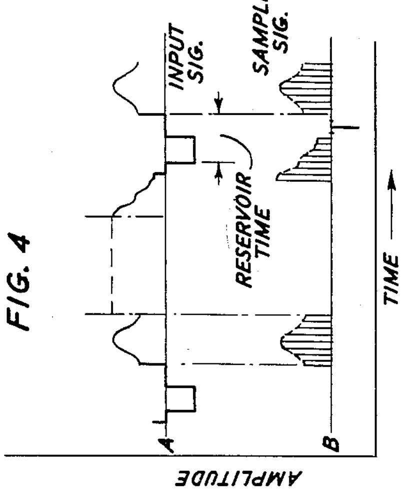
FIG. 4 is a pictorial diagram illustrating various temporal relationships of samples employed in the representation of a portion of a television signal in accordance with the invention.

FIG. 4 illustrates in graphical form the temperal relationship of transmitted samples representative of a portion of a typical composite television signal. Line A of the diagram represents a portion of a single line of such a signal including horizontal blanking and horizontal synchronizing signals. Line B shows representative samples corresponding to the signal as obtained, for example, at the output of the transmitter sampler 14. The samples appearing at the left hand portion of line B, representative of the video portion of the signal, are shown in synchronism with the signal of line A. This represents normal operation in which successive samples are accurately predicted and for which the quantized error signal lies within the permissible portion of the quantizer staircase. At the right hand portion of line B the samples representative of the video and synchronizing portions of the signal are shown displaced to the right with respect to the corresponding signals of line A. This represents the condition in which extra describing samples have been inserted into the signal within the line of video information scanned, shown as a dotted line for simplicity, for large errors in prediction and for which the quantized error signals lie in the outer (±10) levels of quantization. As shown, the samples at the right hand end of line B extend into the normal horizontal blanking portion of the signal. This interval provides the necessary reservoir of sample times. Only a vestigial portion of the synchonizing pulse and back porch is retained. For the case illustrated, the residual portion of the synchronizing pulse is represented by a single negative going sample extending into the blacker-than-black region of the signal, followed by a single "zero" sample. The samples derived from the delay circuit 35, following the stepping action instigated by the transmitted cue signals and representative of the vestigial synchronizing wave form, are again in proper time relationship with the video signal. By means of the reconstituting means described above, the normal synchronizing and blanking wave form are completely reestablished and reinserted into the composite signal in the proper time position.

The benefit derived from the additional samples may be seen from the following table which shows, for the simple previous-value type of predictor, the alphabets of signal increments available to the receiver for normal operation, for operation with one additional prediction value per sample, and for operation with two additional prediction values per sample. The figures are given in percent of original signal input range.

*Table I.—Receiver Alphabets*

| Normal Operation | One Additional Prediction | Two Additional Predictions |
|---|---|---|
| (±) 1 | (±) 1 | (±) 1 |
| 2 | 2 | 2 |
| 4 | 4 | 4 |
| | 6 | 6 (+10, −4) |
| | 8 | 8 (+10, −2) |
| | 9 | 9 (+10, −1) |
| | 11 | 11 (+10, +1) |
| | 12 | 12 (+10, +2) |
| | 14 | 14 (+10, +4) |
| | | 16 (+10, +10, −4) |
| | | 18 (+10, +10, −2) |
| | | 19 (+10, +10, −1) |
| | | 21 (+10, +10, +1) |
| | | 22 (+10, +10, +2) |
| | | 24 (+10, +10, +4) |

For the decision levels shown in the staircase characteristic of FIG. 3, Table I indicates that the maximum error in reproducing a sudden transient in brightness occurring in the range below the decision levels corresponding to ±5.6% of input signal range will be no greater than ±1.6% of the input signal range. For example, a signal falling between the 2.8 to 5.6% decision levels will be quantized to level 4 and the maximum error will be 1.6%. Whenever the prediction error exceeds 25.6% (10+10+5.6%) a third auxiliary sample is called for and so on with an additional or extra sample being required for each added 10% of prediction error. However, as discussed hereinabove, large errors tend to be extremely rare. In any case, the reproduction errors will never exceed the ±1.6% values unless the stepping switches reach the right hand end of the respective delay lines before the end of a scanning line. With one extra sample, the receiver alphabet is substantially enlarged to eighteen decision levels as shown in the Table above and for two extra samples, the alphabet is enlarged to encompass thirty representative levels.

The number of Nyquist interval taps required on the delay line circuits 12 and 35 is equal to the maximum number of prediction errors exceeding 5.6% to be allowed during a single line scan, counting errors between 5.6 and 15.6 once; those between 15.6 and 25.6 twice, and so on. This is, of course, subject to the limit imposed by the length of the horizontal blanking interval. Alternatively, the reserve of extra samples may be carried over from one line scan to the next instead of concluding each encoding operation at the end of each scan. However, instrumentation is less complex for the former system. In a practical system approximately twenty taps are required for ordinary picture material, although this may not prove satisfactory for complex test charts and the like. In the event that the right hand end of the delay line is reached before the end of a given line scan, as will inevitably happen for some types of subject matter, the system operation is locked in the normal or uniform sampling mode and the receiver alphabet is limited to ±(1, 2, 4, 10). The effect of this is to reduce the effectiveness with which large transients are portrayed during the remainder of the particular line scan. However, no appreciable quantizing distortion of the conventional sort will occur.

Figure 5:
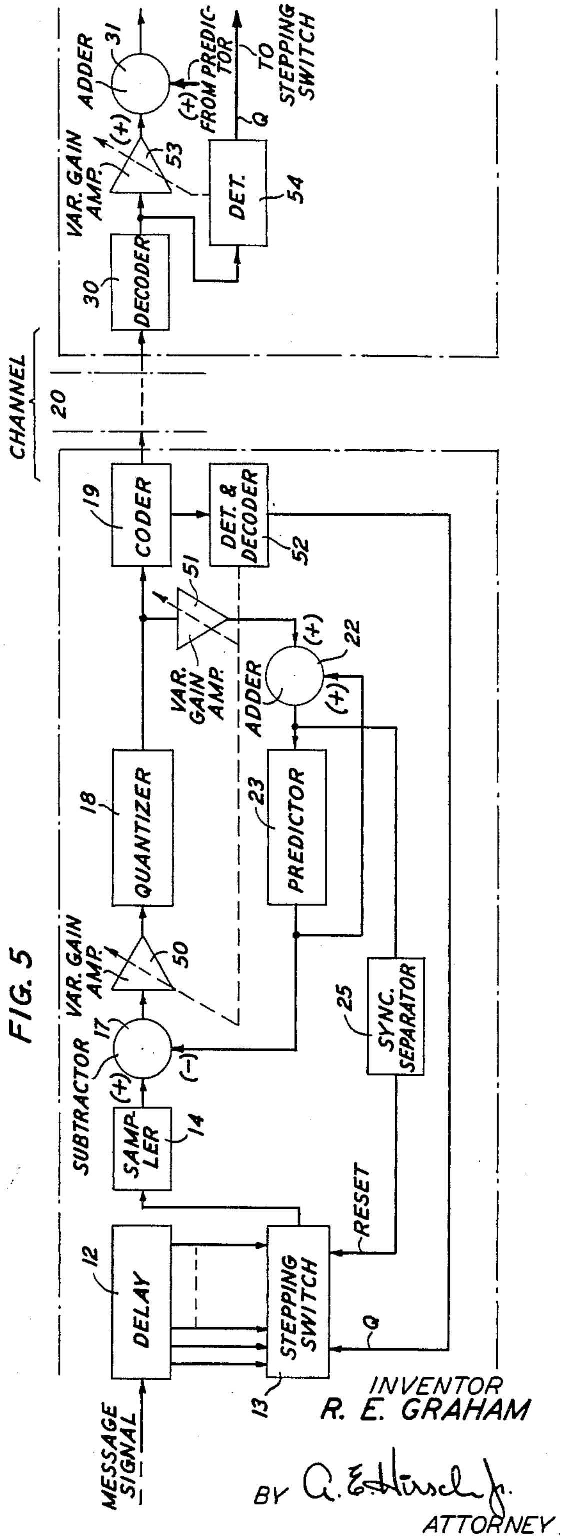
FIG. 5 is a block schematic diagram of an illustrative variable gain predictive-quantizing system in accordance with the invention.

FIG. 5 shows a modification of the prediction system of FIG. 1 in which both the input and output scales of the quantizer staircase are increased for each successive extra prediction of the same sample. A modification in the effective staircase characteristic is in line with the aforementioned observation that larger reproduction errors may be allowed for larger transitions in brightness. Thus, for each new attempt to predict a particular sample within acceptable limits, the decision levels and the representative levels of the quantizer are progressively increased. This is conveniently accomplished by inserting a first variable gain amplifier 50 between the subtractor 17 and quantizer 18 and a second variable gain amplifier 51 between quantizer 18 and adder 22. Gain of the two amplifiers is controlled by decoder 52. Although the amplifier 51 may be inserted at any point between the quantizer and the adder, instrumentation of coder 19 is somewhat easier if amplifier 51 is positioned, as shown, between the junction of quantizer 18 and coder 19, and adder 22. A similar variable gain amplifier 53 is employed at the receiver and may be positioned between decoder 30 and adder 31. This gain is adjusted by signals derived from code detector 54 so that its operation is identical to that of its counterpart at the transmitter.

Figure 6:
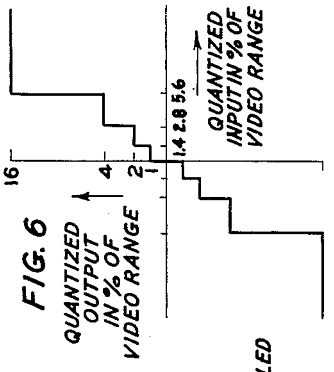
FIG. 6 is a graphic representation of the transfer characteristic of a quantizer suitable for use in the variable gain predictive-quantizing system shown in FIG. 5.

The amplifiers are adjusted for unity gain during normal operation, i.e., for a succession of quantized prediction errors lying within the interior levels of the quantizer staircase. The quantizer staircase of this condition is shown in FIG. 3. When an extra sample is called for at the transmitter, this condition is detected by the code detector 52 and the gain of amplifier 50 is reduced to one-half, and the gain of amplifier 51 is increased to two for the processing of that extra sample. This momentarily doubles both the decision levels and the representative levels of the quantizer. If an immediately following extra sample is required, the gain of amplifier 50 is decreased to one-quarter and the gain of amplifier 51 is increased to four and so on. At the receiver, occurrence of a repeated predicted sample is detected in detector 54 and the gain of amplifier 53 is increased in a fashion identical to that of amplifier 51 at the transmitter. The quantizer staircase for the amplified condition is shown in FIG. 6 and the resulting receiver alphabet under various conditions is tabulated inTable II.

*Table II.—Receiver Alphabets—Variable Gain Operation*

| Normal Operation | One Additional Prediction | Two Additional Predictions |
|---|---|---|
| (±) 1 | (±) 1 | (±) 1 |
| 2 | 2 | 2 |
| 4 | 4 | 4 |
| | 8 (16−2×4) | 8 |
| | 12 | 12 |
| | 14 | 14 |
| | 18 | 18 |
| | 20 | 20 |
| | 24 | 24 |
| | | 32 (16+16−4×4) |
| | | 40 |
| | | 44 |
| | | 52 |
| | | 56 |
| | | 64 |

For prediction errors up to 27.2%, the maximum reproduction error will be ±3.2% and range up to ±6.4% for prediction errors as high as 70.4%. These errors are somewhat larger than those for the constant gain system but, nevertheless, are relatively undetectable. A comparison of Tables I and II shows that considerably greater coverage is achieved by the variable gain system.

For most pictorial material, the demand for two successive auxiliary samples is extremely rare, probably occurring no more than once or twice per scanning line. Hence, for controlled delays having about ten to twenty Nyquist interval taps, the variable gain system provides received pictures indistinguishable from the originals at a transmission rate of three bits per picture sample.

Figure 7:
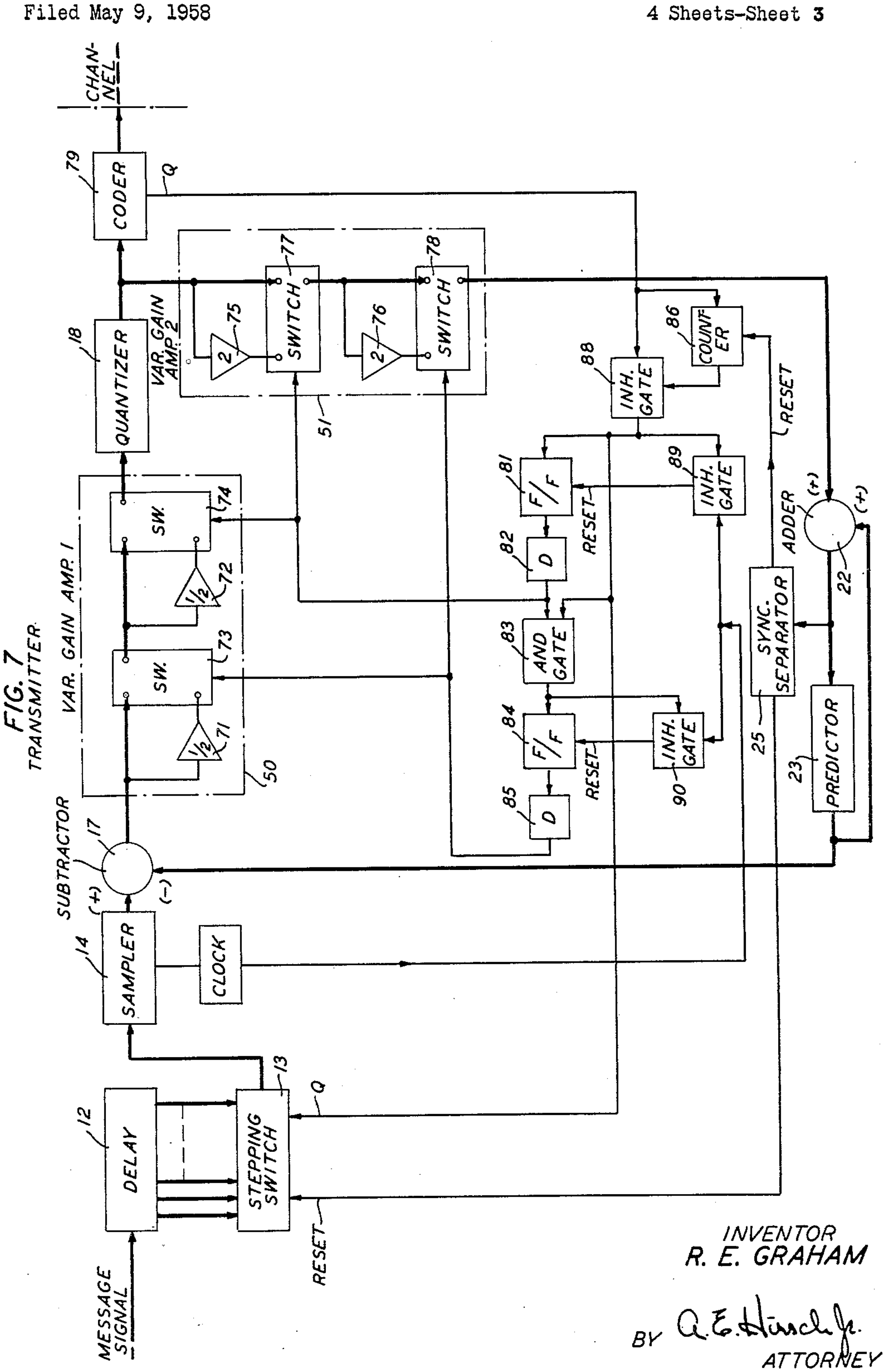
FIG. 7 is a detailed block schematic diagram of the transmitter of the variable gain system shown in FIG. 5.

It is evident that the variable gain amplifiers employed in the embodiment of the invention shown in FIG. 5 may assume any form well known in the art, and that the controlling signals may likewise be derived in accordance with the desired program by standard computer techniques. One illustrative arrangement of the transmitter portion of a variable gain predictive quantizing system is shown in detail in FIG. 7. In FIG. 7 the interconnection of circuit elements, shown by heavy lines, corresponds to the primary portions of the circuit previously described. The dashed lines include variable gain amplifiers which correspond to amplifiers 50 and 51 in simplified diagram of FIG. 5. Each amplifier includes a plurality of fixed gain amplifiers, two in the present example, interconnected by means of a corresponding number of single-pole, double-throw switches in a fashion such that the applied signals may be passed through one of the amplifiers only, through two of the amplifiers in cascade, or may by-pass the amplifiers altogether. For example, in variable gain amplifier 50, fixed gain amplifiers 71 and 72, each with a gain of one-half, are interconnected by means of switches 73 and 74. Variable gain amplifier 51 similarly includes fixed gain amplifiers 75 and 76, each with a gain of two, and switches 77 and 78. Fully electronic switches employing, for example, diode networks, are preferred for this application although their mechanical counterparts are, of course, satisfactory in principle.

The switches are activated by pulses derived from a logic network under the influence of cueing signals derived, for example, from coder 79 and indicative of a prediction sufficient in error to require a reprediction of the sample. For normal samples for which the error is suitably small and for which a reprediction is unnecessary, the switches by-pass all of the amplifiers and unity gain throughout the prediction loop is established. When a sample occurs for which a large prediction error is produced, the error occupies the outer level of the quantizer staircase. The code pattern of this condition is detected and a cue signal is generated. The cue signal is applied to a number of elements in the circuit and performs a number of functions. As before, it activates switch 13 and steps the delay line circuit 12 to the right by one tap sufficiently slowly that the present sample is obtained from the delay circuit before the stepping takes place. In addition, it changes the state of flip-flop 81. The output of the flip-flop is delayed slightly in delay line 82 and is used to actuate switches 74 and 77 thereby to insert amplifier 72 into the path between subtractor 17 and quantizer 18, and to insert amplifier 75 into the path between quantizer 18 and adder 22. Thus, the decision levels and representative levels of quantizer 18 are effectively doubled for the period during which the reprediction of the troublesome sample is effected. The output of flip-flop 81 is also supplied to AND gate 83. If the next sample is predicted satisfactorily, flip-flop 81 is reset by a clock pulse and switches 74 and 77 return to their normal conditions such that amplifiers 72 and 75 are by-passed. Once again this reversion to the normal condition is slightly delayed so that the instant sample is treated with the abnormal gain condition. On the other hand, if the next sample also produces a large prediction error, flip-flop 81 remains in its alternate state and the cue signal is passed by AND gate 83, and changes the state of flip-flop 84. It also steps the delay circuit connection one step to the right in normal fashion. The change in state of flip-flop 84 activates switches 73 and 78 and inserts amplifiers 71 and 76, respectively, into the system so that the net transmission to the next following sample is reduced to one-quarter preceding quantizer 18 and increased to four following the quantizer. If the subsequent sample is predicted with sufficient accuracy, it will, nevertheless, receive the modified gain treatment whereupon all gains will be restored to normal.

If a sufficiently large number of additional predictions are required and the end of the delay line circuit 12 is reached before the leading edge of the synchronizing pulse occurs, which normally resets the delay circuit, an auxiliary counter 86 applies a pulse to inhibit gate 88 and prevents the passage of any further cue signals so that no further changes in transmission gain of the predictor loop occurs. The counter 86 may be adjusted to count Nyquist intervals thereby to maintain a running count of the number of reserve or extra sample positions along a single line of signal. It is reset periodically by synchronizing pulses derived from synchronizing signal separator 25. When the leading edge of the synchronizing pulse does occur, the delay circuit connection is reset to the left hand terminal and the counter 86 is similarly reset. Thus, inhibit gate 88 prevents cueing signals derived from coder 79 from reaching the delay line 12 or the flip-flops after the maximum allowable number of cueing signals, corresponding to the available number of delay line terminals, has been reached. Inhibit gates 89 and 90 control the change of state of flip-flops 81 and 84, respectively, in order that a change of state may not occur except at normal sample times and in the presence of a cueing signal.

Figure 8:
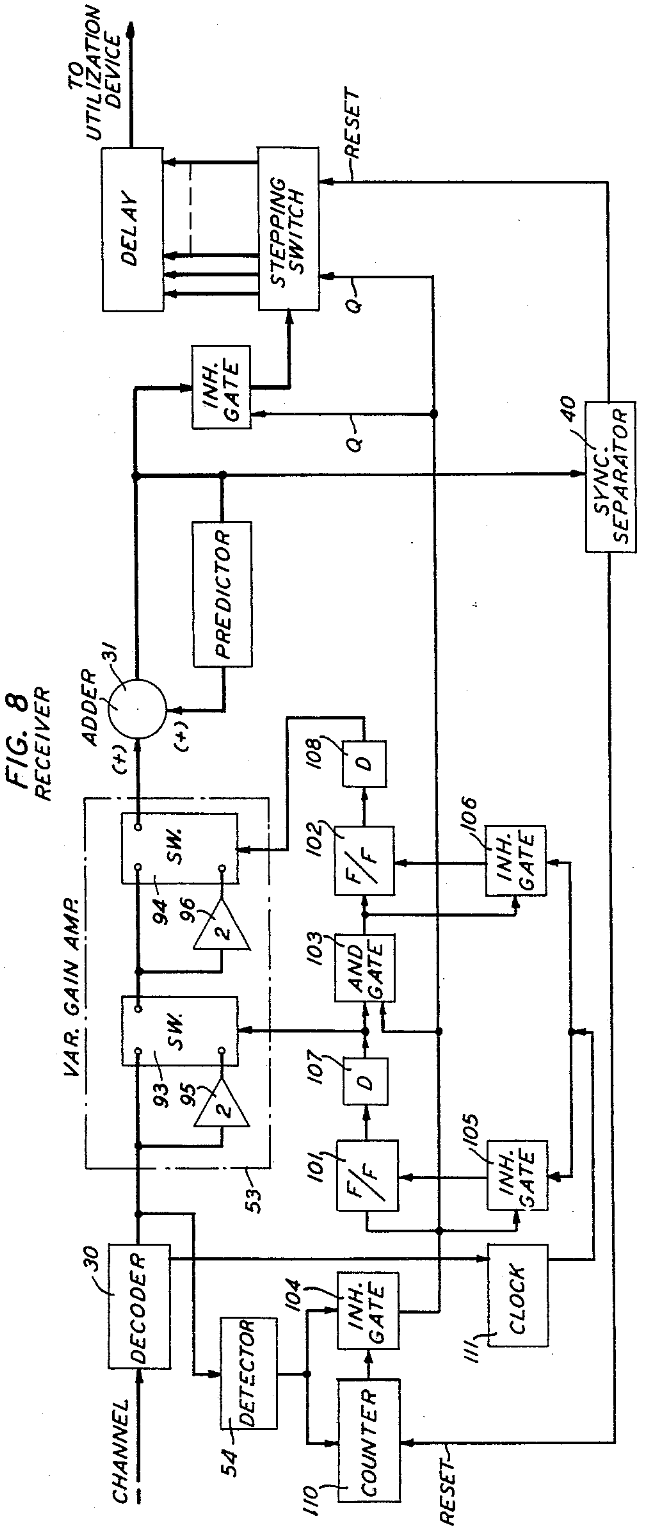
FIG. 8 is a detailed block schematic diagram of the receiver of the variable gain system shown in FIG. 5.

The operation of the receiver shown in FIG. 8 is similar to that described in connection with FIG. 7. Amplifier 53 includes switches 93 and 94 which interconnect, respectively, amplifiers 95 and 96, each of which has a gain of two, into the circuit between decoder 30 and adder 31. The logic circuitry controlling these switches includes flip-flops 101 and 102, AND gate 103, inhibit gates 104, 105 and 106 and counter 110. Fractional sample delays 107 and 108 insure that the switching operations occur after the initiation of a step of delay line 12.

Figure 9:
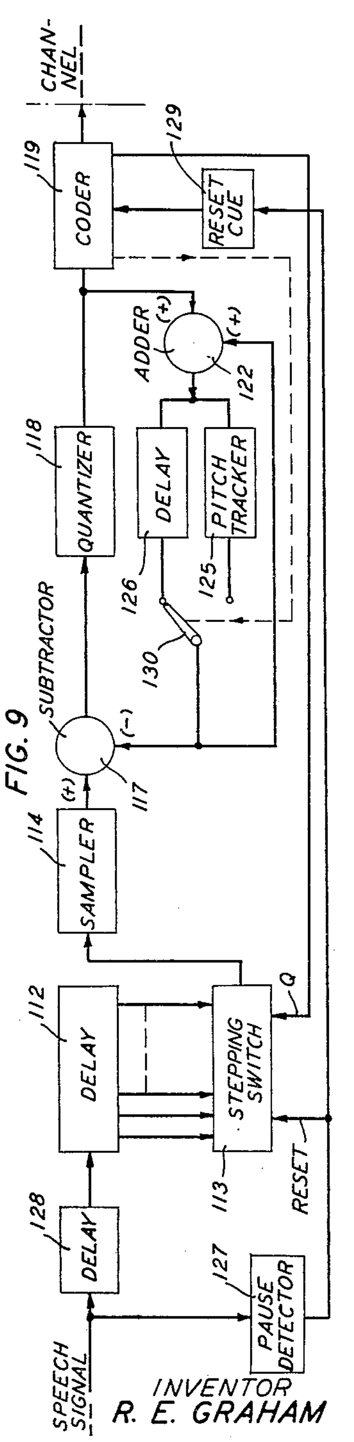
FIG. 9 is a block schematic diagram showing transmitter apparatus particularly suitable for the treatment of voice frequency signals in accordance with the invention.

Although the invention has been described, by way of example, in terms of standard television signal transmission, the basic principles involved are, of course, equally well applicable to the transmission of any form of communication signals. All that is required is that programming of the equipment be suitably altered to accommodate the particular form of signals. For example, FIG. 9 illustrates, by means of a block schematic diagram, transmitting apparatus particularly suitable for the processing of voice frequency signals. For voice frequency signals, the reservoir intervals from which the required extra sample times are drawn, may be furnished by silent pauses occurring in the speech signal which occur, for example, between words, phrases and sentences.

The transmitter is basically similar to that shown in FIG. 1. It includes a tapped delay line circuit 112 supplied with input speech signals and arranged to supply signals with a controlled amount of delay to sampler 114. Stepping switch 113 is provided to select signals from the delay circuit 112 in accordance with control signals supplied from suitable control circuitry. For example, it may be arranged to step to the right one terminal for each cue signal derived from coder 119 and reset to the left end terminal on cue from a pause detector 127. The basic predictive-quantizer comprises subtractor 117, supplied both with samples from sampler 114 and predicted values of the sample, quantizer 118, adder 122 and a predictor structure including both a variable delay circuit which approximates the pitch period, e.g., a pitch tracker 125, and an alternate delay circuit 126 having a one Nyquist interval delay. The signal derived from either the pitch tracker 125 or the delay device 126 is selected by electronic switch 130 and applied to the subtractor 117. Under normal conditions, the switch 130 selects signals from the pitch tracker 125 but is switched momentarily to the Nyquist delay line 126 upon receipt of a cue signal from the coder 119. Pitch tracker 125 need not guard against confusion with second harmonics of the signal inasmuch as it need only find "any" repetitive period. Circuits for accurately tracking the pitch of voice signal are well known in the art. One suitable form is shown and described in R. R. Riesz, Patent 2,593,698, April 22, 1952.

The pause detector 127 is designed to operate whenever a pause in the voice frequency signal exceeds a pre-established period of controlled delay which may be, for example, approximately .01 second. The excess time is required to insert the cueing signal described above and is provided by cueing delay line 128 which imparts the necessary one millisecond delay to the input signals. The cueing signal, derived from pause detector 127 also resets the stepping switch, of course, thereby returning the input connection of delay circuit 112 to the left end at both the transmitter and the receiver. Pause detectors suitable for generating the necessary cueing signals are described, for example, in A. E. Melhose, Patent 2,541,932, February 13, 1951. Cueing of the receiver for resetting is carried out by reserving a suitable code sequence, extending over approximately a millisecond, for that purpose and transmitting it to the receiver whenever a cue signal, generated in reset cue generator 129 under influence of a signal derived from pause detector 127, is produced. The reset cue signal may be combined with the quantized output signal for transmission in coder 119.

Whenever a large prediction error causes the stepping switch to step to the right, thus injecting an extra prediction sample, the switch 130 is momentarily thrown to the Nyquist interval delay circuit 126 to obtain the greatest benefit from the held-over sample. Alternatively, the delay 126 may be allowed to compete continually with the pitch tracker 125 in a runing selection of the best prediction mode in the fashion discussed in my aforementioned application, Serial No. 625,476.

Figure 2:
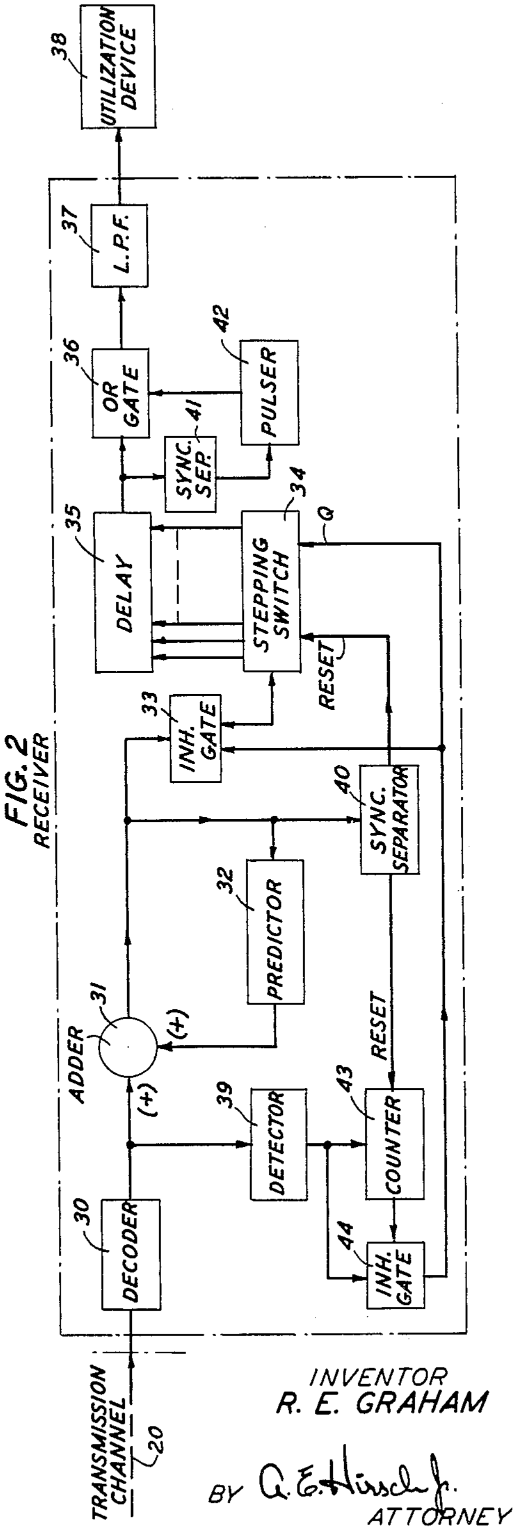
FIG. 2 is a block schematic diagram showing receiver station apparatus embodying the invention.

The details of receiver apparatus suitable for restoring signals received from the transmitter of FIG. 9 are broadly similar to those of the receiver illustrated in FIG. 2 modified in accordance with the details of FIG. 9, except that no pause detector is required for operation.

There has been described a pulse code modulation transmission system in which a plurality of signals interleaved in time for transmission are altered in a fashion such that the accuracy with which at least one signal is transmitted is improved. Although the method and apparatus for achieving this improvement has been described primarily in terms of the time scale expansion of one signal to occupy idle intervals in the signal, it is obvious that the principles described can easily be extended to multiplex transmission systems by reciprocally altering the time scale of at least two independent signals preparatory to encoding, thereby granting a priority in time permitted for encoding to one of the signals over the other. By this means the simplicity of systematic sampling is retained and yet the advantage of erratic sampling used in conjunction with elastic coding is preserved.

Other possible operating systems and various modifications and extension of the illustrative embodiments discussed above will suggest themselves to the reader.

What is claimed is:

1. In a communication system, means supplied with a message wave for providing a succession of wave samples, means for expanding the time scale of selected successions of wave samples in accordance with the richness of detail represented by said succession of samples, means for compressing the time scale of selected successions of samples representative of repetitive identifying signals, and means for transmitting said several successions of samples in time alternation to a receiver station.

2. In a communication system defined in claim 1, receiver apparatus means for respectively compressing the time scale of received successions of samples expanded for transmission and expanding the time scale of received successions of samples compressed for transmission, and means for combining said several sequences to form a replica of said message wave.

3. In a communication system, means, supplied with a message wave comprising a plurality of intercalated independent waves, for providing corresponding successions of wave samples, means for expanding the time scale of at least one of said successions of wave samples in accordance with the richness of detail of said independent wave represented by said succession, means for compressing the time scale of at least one of said successions of wave samples, and means for transmitting said plurality of intercalated waves as modified to a receiver station.

4. In a communication system, a source of continuously variable message signals, means at a transmitter station for controllably delaying applied message signals, means for periodically sampling said delayed signals thereby to derive message samples, means for quantizing the difference between the instantaneous amplitudes of said message samples and the amplitudes of corresponding samples based upon the past history of said message signal to produce quantized difference signals, means responsive to the amplitudes of said quantized difference signals for controlling the period of delay imparted to said message signals by said delay means, means for encoding said quantized difference signals for transmission to a receiving station and, at said receiving station, means for reconstituting said message signal from said encoded signals as received.

5. Transmission apparatus comprising a source of a continuously variable message signal, means at a transmitter station for controllably delaying an applied message signal, means for periodically sampling said delayed signal thereby to derive message samples, means for quantizing the difference between the instantaneous amplitudes of said message samples and the amplitudes of corresponding samples based upon the past history of quantized differences to produce quantized difference signals, means for translating said quantized difference signals into representative code pulse groups for transmission to a receiving station, and means responsive to selected code pulse groups for controlling the period of delay imparted to said message signals by said delay means.

6. In combination with apparatus as defined in claim 5 receiving apparatus for reconstituting said message signal comprising means for translating received code pulse groups into representative quantized difference signals, means for algebraically combining the instantaneous amplitudes of said quantized difference signals and the amplitudes of corresponding samples based upon the past history of said message signal to produce reconstituted message samples, means for controllably delaying said reconstituted samples, means responsive to selected received code pulse groups for controlling the period of delay imparted to said reconstituted message samples, and means for applying said delayed message samples to an output terminal.

7. Transmission apparatus comprising a source of continuously variable message signals, means at a transmitter station for storing applied message signals for variable intervals, means for periodically sampling said stored signals thereby to derive message samples, means for quantizing the difference between the instantaneous amplitude of each of said message samples and the amplitude of a corresponding one of said samples based upon past quantized difference signal values to produce quantized difference signals, means for converting said quantized difference signals into code pulse groups for transmission to a receiver station, means for detecting code pulse groups representative of selected difference signal values, means for generating a control signal pulse in response to each of said detected code pulse groups, means responsive to said control signal pulses for varying said intervals of storage, means for transmitting said code pulse groups to a receiver station and, at said receiver station, means for reconstituting said message signal from said code pulse groups as received.

8. Transmission apparatus as defined in claim 7 wherein said means for storing said message signals comprises a delay line circuit provided with an input terminal and a plurality of independent output terminals laterally separated at intervals corresponding substantially to an integral number of sampling intervals.

9. Transmission apparatus as defined in claim 8 wherein said means for varying said interval of storage comprises switching means provided with a plurality of independent input terminals each one of which is connected to a corresponding one of said output terminals of said delay line circuit, a single output terminal, and a control terminal, means for applying said control signal pulses to said control terminal thereby to establish sequentially a direct connection between said input terminals and said output terminal in response to successive control signal pulses.

10. In combination with a source of a message wave, means at a transmitter station for variably delaying a message wave, means for periodically sampling said delayed wave thereby to derive message samples, means for quantizing the difference between the instantaneous amplitudes of said message samples and the amplitudes of corresponding predicted sample values of said message wave to produce quantized difference signals, said quantizing means being characterized by a nonlinear staircase transfer characteristic, means responsive to the amplitudes of said quantized difference signals for varying the period of delay imparted to said message wave by said delay means, means for encoding said quantized difference signals for transmission to a receiving station and, at said receiving station, means for reconstituting said message wave from said quantized difference signals as received.

11. In a communication system, a source of message signals, means at a transmitter station supplied with message signals for providing at each instant a plurality of message signals separated by preassigned time intervals, each representative of a signal preceding an instant applied signal and progressively delayed with respect to said instant applied signal, means for periodically sampling a selected one of said delayed message signals to derive message samples, means for differentially combining successive selected message samples with corresponding predicted values of said samples to derive for each combination an error signal, quantizing means characterized by a nonlinear relationship between successive levels of quantization for quantizing the output of said combining means to derive quantized error signals, means for transmitting said quantized error signals to a receiver station, and means at said receiver station for utilizing received error signals to reconstruct a facsimile of said message signals.

12. In a television transmission system, means supplied with a television wave for providing instantaneous samples of said wave, means for storing each of said samples for a period equal to an integral number of sample intervals, algebraic combining means supplied with samples selected from said storage means and with predicted values of said samples for deriving signals representative of the errors between the amplitudes of said selected samples and said predicted values, means for detecting the values of said errors, means for generating a control signal pulse for each error signal exceeding a preassigned threshold value, means for increasing said storage period by one sample interval for each control signal pulse generated thereby effectively to supply once again the instantaneous samples for which the corresponding error signals exceed said preassigned threshold value to said algebraic combining means whereby there are derived signals representative of the errors between the amplitudes of said repeated samples and second predicted values of said repeated samples, and means for transmitting to a receiver station said error signals.

13. In a communication system, a source of a continuously variable message signal, means at a transmitter station for deriving from an applied message signal a plurality of adjacent samples of said signal separated by preassigned time intrevals which comprises a delay line having an input terminal and a plurality of output terminals connected to a plurality of points spaced along its length, the locations of said terminals being correlated with said preassigned time intervals, a translating device connected to each of said terminals, each of said translating devices having an output circuit and an energizing circuit, said output circuits being connected together, means for differentially combining successive message samples derived from said common output circuit associated with said translating devices and corresponding predicted values of said samples thereby to derive for each differential combination an error signal, means for quantizing said error signals, means responsive to the amplitudes of said quantized error signals for selectively energizing at least one of said translating devices for each error signal, means for transmitting said quantized error signals to a receiver station and, at said receiver station, means for utilizing received error signals to reconstruct a facsimile of said message signal.

14. In a communication system, a source of message signals, means at a transmitter station for controllably delaying said message signals, means for periodically sampling said delayed signals thereby to derive message samples, means for quantizing the difference between the instantaneous amplitudes of said message samples and the amplitudes of corresponding samples based upon the past history of said message signal, means responsive to the amplitude of each of said quantized difference signals for deriving a control signal pulse for each of said difference signals which exceeds in amplitude a preassigned level, means for increasing the period of delay imparted to said message signals by one sample period in response to each control signal pulse, means responsive to silent intervals occurring in said message signals for decreasing the period of delay imparted to said message signals by the total number of periods by which said delay was increased since the last occurrence of a silent interval in said message signal, means for encoding said quantized difference signals for transmission to a receiving station and, at said receiving station, means for reconstituting said message signal from said encoded signals as received.

15. A communication system comprising a source of continuously variable message signals, means, at a transmitter station, comprising a delay line having an input terminal and a plurality of output terminals spaced apart along the length of said line for delaying an applied signal, means for applying a message signal to the input terminal of said delay line, means for selectively deriving brief samples of said message signal from one of said delay line terminals, means for differentially combining said delayed samples and corresponding predicted sample values of said message signal to form error signals, means for quantizing said error signals to form quantized error signals, means for selectively altering the transfer characteristic of said quantizing means in accordance with the magnitude of said quantized error signals, means responsive to the magnitude of said quantized error signals for generating control signals, means responsive to said control signals for sequentially stepping said means for selectively deriving brief samples of said message signal from said delay line terminals to terminals respectively representative of progressively greater delay periods, means for periodically returning said deriving means to a preassigned terminal, means for transmitting said quantized error signals to a receiver station, and at said receiver station, means for utilizing said received error signals to reconstruct a facsimile of said message signal.

16. A communication system defined in claim 15 wherein said means for selectively altering the transfer characteristic of said quantizing means comprises a first variable gain amplifier for altering the gain of said error signals applied to said quantizing means, a second variable gain amplifier for altering the gain of said quantized error signals, and means responsive to said control signals for complementarily varying the gain of said amplifiers.

17. In a communication system, means for adapting a plurality of independent signals for transmission in time alternation over a channel of limited bandwith, said means comprising, means for sampling each of said independent signals, means supplied with samples of each of said signals for quantizing respectively the difference between the instantaneous amplitude of each of said samples and the amplitude of a predicted value thereof, means for complementarily altering the time scales of at least two of said quantized sample differences in accordance with the richness of detail in said individual signals, and means for transmitting said altered quantized sample differences in time alternation over said channel.

18. In a communication system, a source of a message wave, means at a transmitter station for determining at each instant the amplitude of said message wave, means for recurrently combining each such determined amplitude with a prior determined amplitude to derive a difference signal, means including a coder for normally translating each of a number of different amplitudes, less than a preassigned threshold, into a code word of $n$ code elements, $n$ being insufficient for the satisfactory coding of every possible difference signal magnitude, means for continuously monitoring the magnitude of said difference signal to derive a control signal on occasions when the magnitude of the difference signal exceeds said preassigned threshold, means responsive to said control signal for translating each difference signal magnitude that exceeds said threshold into a different and distinguishable code word, means for transmitting said code words as pulse groups to a receiver station, and means at said receiver station, for utilizing said transmitted pulse groups to reconstruct a facsimile of said message wave.

References Cited in the file of this patent

UNITED STATES PATENTS

| | | |
|---|---|---|
| 2,664,462 | Bedford et al. | Dec. 29, 1953 |
| 2,676,202 | Filipowsky | Apr. 20, 1954 |
| 2,686,869 | Bedford | Aug. 17, 1954 |
| 2,724,740 | Cutler | Nov. 22, 1955 |